(12) United States Patent
Tadimeti et al.

(10) Patent No.: US 7,656,812 B2
(45) Date of Patent: Feb. 2, 2010

(54) MONITORING OF DATA PACKETS IN A FABRIC

(75) Inventors: Raja Rao Tadimeti, San Jose, CA (US); Madhava Rao Cheethirala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 11/495,405

(22) Filed: Jul. 27, 2006

(65) Prior Publication Data

US 2008/0025322 A1    Jan. 31, 2008

(51) Int. Cl.
*H04J 1/16* (2006.01)
*H04L 12/56* (2006.01)

(52) U.S. Cl. .................. 370/248; 370/252; 370/254; 370/389

(58) Field of Classification Search .................. 370/252, 370/241–250, 254, 389
See application file for complete search history.

(56) References Cited

U.S. PATENT DOCUMENTS

| | | | |
|---|---|---|---|
| 6,381,642 B1 | 4/2002 | O'Donnell et al. | |
| 6,819,654 B2 | 11/2004 | Soloway et al. | |
| 2004/0153854 A1 | 8/2004 | Agrawal et al. | |
| 2005/0053073 A1 | 3/2005 | Kloth et al. | |
| 2005/0058131 A1* | 3/2005 | Samuels et al. | 370/389 |
| 2005/0108444 A1 | 5/2005 | Flauaus et al. | |
| 2005/0169188 A1 | 8/2005 | Cometto et al. | |
| 2005/0286551 A1* | 12/2005 | Berman | 370/465 |
| 2006/0072587 A1 | 4/2006 | Ramaswamy et al. | |
| 2007/0189189 A1 | 8/2007 | Andrews et al. | |

OTHER PUBLICATIONS

Cisco MDS 9000 Fabric Manager Switch Configuration Guide, Mar. 2004, 435 pages.
"Using the CFS Infrastructure," Chapter 5, Cisco MDS San-OS, Release 2.x, 12 pages.
"Troubleshooting Your Fabric," Chapter 49, Cisco MDS San-OS, Release 2.x, 18 pages.
"Configuring the Catalyst Switched Port Analyzer (SPAN) Feature," Jun. 2004, http://www.cisco.com/warp/customer/474/41.html, 29 pages.
"Configuring SPAN and RSPAN," Chapter 23, Catalyst 3550 Multilayer Switch Software Configuration Guide, 24 pages.

* cited by examiner

*Primary Examiner*—John Pezzlo
(74) *Attorney, Agent, or Firm*—Haynes and Boone, LLP.

(57) ABSTRACT

A method of monitoring network traffic in a fabric and a Fibre Channel network are provided. The method includes: transmitting a monitoring configuration message to a plurality of fabric elements in a Fibre Channel network, said monitoring configuration message including classification criteria identifying packets to be monitored; receiving copies of identified packets from the plurality of fabric elements; and analyzing the copies of identified packets to determine data transmission status in the Fibre Channel network. The Fibre Channel network includes: a plurality of fabric elements; a management system configured to transmit a monitoring configuration message to the plurality of fabric elements, said monitoring configuration message including classification criteria identifying packets to be monitored; and an analyzer configured to: receive copies of identified packets from the plurality of fabric elements; and analyze the copies of identified packets to determine data transmission status in the Fibre Channel network.

34 Claims, 3 Drawing Sheets

MONITORING OF DATA PACKETS IN A FABRIC

BACKGROUND

A storage area network (SAN) is a network designed to attach computer storage devices such as disk array controllers and tape libraries to servers. One common SAN design utilizes a plurality of fibre channel (FC) switches which are operatively coupled using inter-switch links (ISL) to form a fabric, such as in an FC-SW topology. The fabric elements (e.g., the fibre channel switches) provide connections between nodes. The nodes are the end devices (e.g., servers or data storage devices) connected to the fabric.

In order to manage the operation of a SAN, it is important that the network administrator be able to monitor data traffic through the fabric. For example, an error in the fabric may cause a loss of communication between two nodes. The network administrator must then identify the source of the problem in order to correct this problem. Various tools have been developed to assist the network administrator in doing so.

For example, a Switched Port Analyzer (SPAN) function has been developed which enables non-disruptive monitoring of network traffic through one or more ports of an FC network device. The SPAN function enables traffic through any FC interface of the FC network device to be replicated and delivered to a port on that FC device. A similar feature, Remote Switched Port Analyzer (RSPAN), enables the replicated traffic to be delivered to a port on a remote network device. Both the SPAN and RSPAN functions are useful for network administration, intrusion detection, and network analysis. However, the configuration of the SPAN and RSPAN functions must be performed on each individual switch. Thus, if the location of an error within a fabric is unknown, it can be time-consuming to monitor each individual switch in order to discover the source of the error. In addition, the path followed by a frame transmitted between two nodes may change dynamically due to changes in the Fabric Shortest Path First (FSPF) configuration.

Another function used for troubleshooting FC fabrics is the FCTrace function. FCTrace is used to determine characteristics associated with routes in a fibre channel network by sending special frames between a source and a destination. Timestamp information is inserted into these special frames at each FC switch through which the frames travel. Once the frames reach the edge of the fabric (the F port or FL port coupled to the destination end node), the frames are routed back to the source node. The timestamp information can enable an administrator to determine characteristics, such as round trip times, inter-switch latency, and connectivity to a destination node for specific routes. Unfortunately, in many cases, the connectivity between two nodes may be broken, but the FCTrace results indicate that the fabric connectivity is operating correctly. This situation may result because FCTrace uses special frames which may undergo different forwarding, network address translation (NAT), and access control decisions compared to actual data frames.

Accordingly, it would be desirable to provide network administrators the ability to easily and accurately monitor network traffic.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In accordance with embodiments of the present invention, systems and methods are provided for capturing FC traffic at each fabric element and forwarding that traffic to an analyzer. Switch monitoring sessions are programmed in each fabric element based on the configuration parameters provided by a management system to capture targeted frames and forward them to a local or remote analyzer port. The switch monitoring sessions may also be programmed to capture frames despite the use of network address translations on those frames. An analyzer may be coupled to the analyzing port to collect all of the captured and forwarded frames. The analyzer may provide a user interface for conveying the information from the captured frames to a user in a meaningful way.

Figure 1:
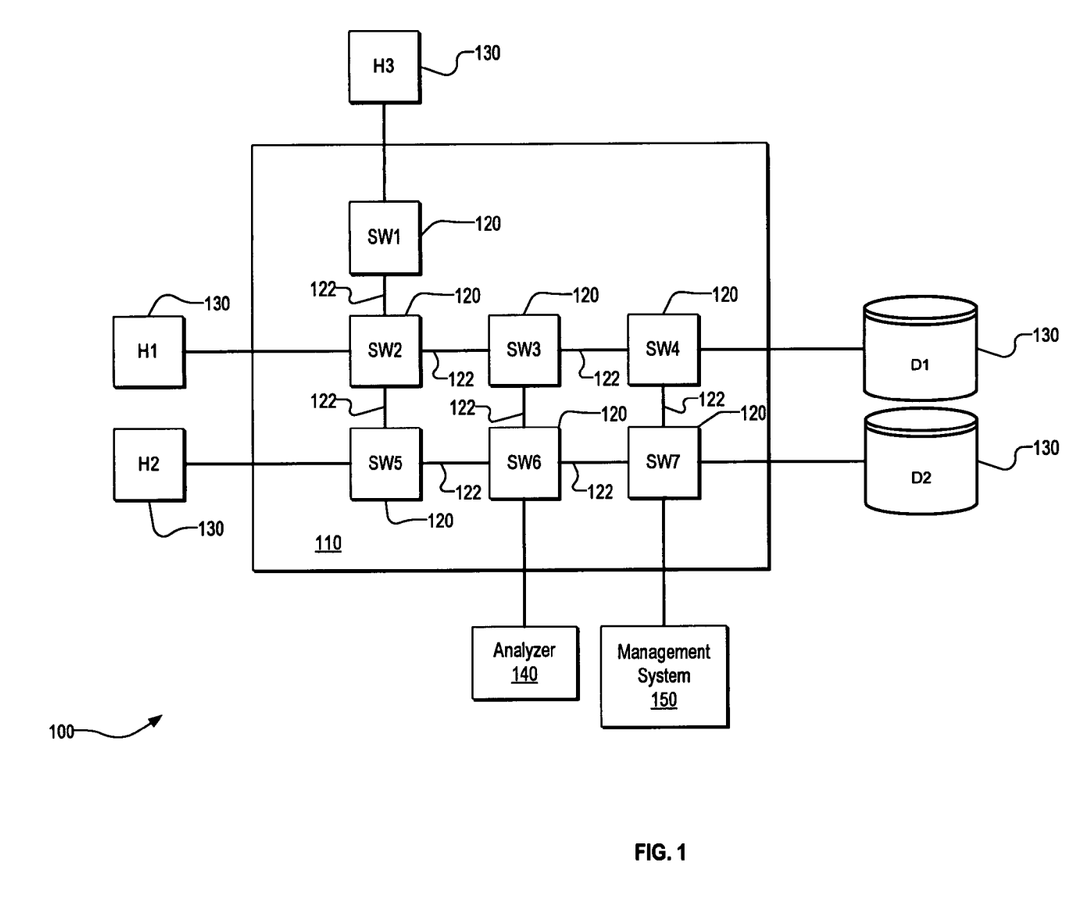
FIG. 1 shows a generalized block diagram of a network, in accordance with embodiments of the present invention.

FIG. 1 shows a generalized block diagram of a network 100, in accordance with embodiments of the present invention. In the illustrated embodiment, the network 100 includes a Fibre Channel (FC) fabric 110. The FC fabric 110 includes a plurality of fabric elements 120 (shown as FC switches SW1-SW7) coupled to each other via inter-switch links (ISL) 122. The illustrated configuration of fabric elements 120 is merely exemplary and in other implementations, there may be greater or fewer fabric elements 120 coupled together in different configurations.

The network 100 also includes a plurality of nodes 130 which utilize the fabric 110 for data transmission between nodes. In FIG. 1, the nodes 130 in the network 100 comprise three hosts H1-H3, two storage devices D1-D2, an analyzer 140, and a management console 150. In other embodiments, the number and type of fabric elements 120 and nodes 130 may vary. The hosts H1-H3 may comprise, e.g., servers or workstations, and the storage devices D1-D2 may comprise, e.g., single hard drives, disk arrays (such as a RAID disk array), or tape drive systems.

Figure 2:
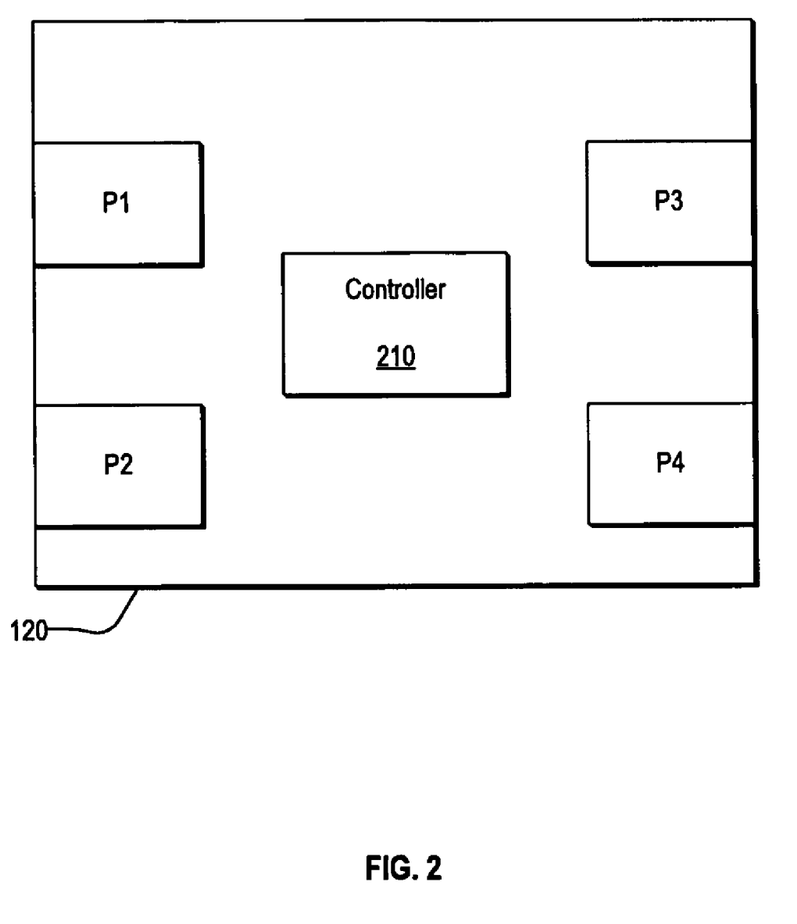
FIG. 2 shows a generalized block diagram of an exemplary fabric element, in accordance with embodiments of the present invention.

FIG. 2 shows a generalized block diagram of an exemplary fabric element 120. The fabric element 120 may comprise, e.g., an FC switch implemented using one or more application specific integrated circuits (ASIC). The fabric element 120 may comprise a plurality of ports (shown in FIG. 2 as ports P1-P4) and a controller 210, such as a microprocessor or microcontroller and volatile/non-volatile memory coupled to the processor and configured to execute stored instructions. The instructions implement the various protocols and data structures described herein. The controller 210 may be coupled to any of the other components and resources within the fabric element 120, such as the ports P1-P4, to implement specific program behavior.

The ports P1-P4 may be used for receiving and transferring FC frames through the element 120. In FIG. 2, the ports P1-P4 may be coupled to a shared memory in the controller 210 and an external optical interface. The external optical interface couples the fabric element 120 to a corresponding optical interface of a port of a neighboring element or node.

When a node 130 (e.g., host H1) is added to the network 100, that node 130 performs a fabric login (FLOGI), in which the node 130 receives a unique Fibre Channel Identifier (FCID) and all fabric elements 120 and nodes 130 are notified of the addition of the new node 130. This FCID may comprise a 24-bit value divided into three 8-bit portions: a Domain ID portion, an Area ID portion, and a Port ID portion. The Domain ID portion identifies the switch to which the node 130 is connected. The Area ID portion and the Device ID portion may be assigned different values depending on the implementation. For example, the Area ID portion may identify the port of the switch to which the node 130 is connected, and the Device ID portion may identify the node 130 itself.

The fabric elements 120 may be utilized for establishing a path and transmitting traffic in the fabric 110 between nodes 130. Each switch SW1-SW7 includes a routing table operatively coupled to each port on the switch SW1-SW7. Each frame that arrives at a port of the switch will identify a destination location (referred to as a Destination ID or DID). The routing table will provide one or more possible exit ports for routing the frame to the destination location.

A protocol implemented on each switch determines one or more shortest paths to any destination in the network 100. In one embodiment, the switch uses a Fabric Shortest Path First (FSPF) protocol, in which each received frame is routed along the shortest path between the switch and the destination node. For each possible destination node 130 in the network 100, the routing table for the switch will identify the exit port corresponding to the shortest path to the destination node 130. If there are multiple paths of equal distance, the routing table will identify the exit ports corresponding to each of those paths. When the routing table identifies more than one possible exit port, the switch can choose the exit port to use based on load balancing or other factors.

For example, referring to FIG. 1, the host H1 may wish to transmit a frame of data to storage device D2. The host H1 transmits the frame to a first port of the switch SW2. This frame identifies storage device D2 as the destination node using the storage device D2's FCID. Because the storage device D2 is coupled to switch SW7, switch SW7 is the destination switch.

As shown in FIG. 1, the switch SW2 has three neighboring switches (SW1, SW3, and SW5). The routing table for SW2 will indicate that the exit ports coupled to either switch SW3 or SW5 may be used for routing a frame to the storage device D2. The switch SW2 will select an exit port from the list of exit ports provided in the routing table and will route the frame to that exit port. The switch coupled to that exit port will receive the frame and route the frame to an exit port in a similar fashion. This will continue until the frame reaches the destination switch SW7. The routing table in the switch SW7 will indicate that storage device D2 is directly coupled to the switch SW7 and will indicate which port to use for transmitting data to the storage device D2. The frame will then be transmitted through that exit port to the storage device D2.

In accordance with embodiments of the present invention, a management system 150 will transmit a monitoring configuration message to a plurality of the elements 120 in the fabric 110. This monitoring configuration message may include classification criteria for identifying the packets to be monitored and forwarding information identifying a location to which the monitored packets should be forwarded.

In accordance with some embodiments, the monitoring configuration message may be transmitted to all of the switches in the fabric 110. The controller 210 in each switch will determine whether and how to apply the classification criteria defined by the monitoring configuration message, depending on the location of the switch and the switches and nodes to which that switch is connected. Accordingly, each switch will make its own determination of whether to monitor any packets, depending on the location of the switch and whether the switch is provided along an expected route for the packets to be monitored.

In other embodiments, the switches will not make the determination of whether to monitor packets. Instead, the switch will automatically apply the monitoring configuration instructions from the management system 150. For each such switch, the management system 150 will make the determination whether the switch should monitor any packets and will transmit an appropriate configuration instruction message to that switch. In some embodiments, the management system 150 may transmit a configuration instruction message to all of the switches in the fabric 110. In response, all of the switches in the fabric 110 will initiate a monitoring session, including the switches that are not on one of the expected routes for the packets to be monitored.

In accordance with some embodiments, the monitoring performed by each switch is accomplished using the SPAN and RSPAN functions currently provided by switches already on the market, such as the MDS 9000 Family of Multilayer Directors and Fabric Switches from Cisco Systems, Inc., of San Jose, Calif. Based on the rules defined by the monitoring configuration message, each switch will configure the SPAN/RSPAN function for that switch in order to capture the targeted packets.

In accordance with some embodiments, the distribution of the monitoring configuration message may be accomplished using the Cisco Fabric Services (CFS) infrastructure currently provided by the Cisco MDS 9000 Family of Multilayer Directors and Fabric Switches. CFS provides a common infrastructure for automatic configuration synchronization of switches in the fabric.

Figure 3:
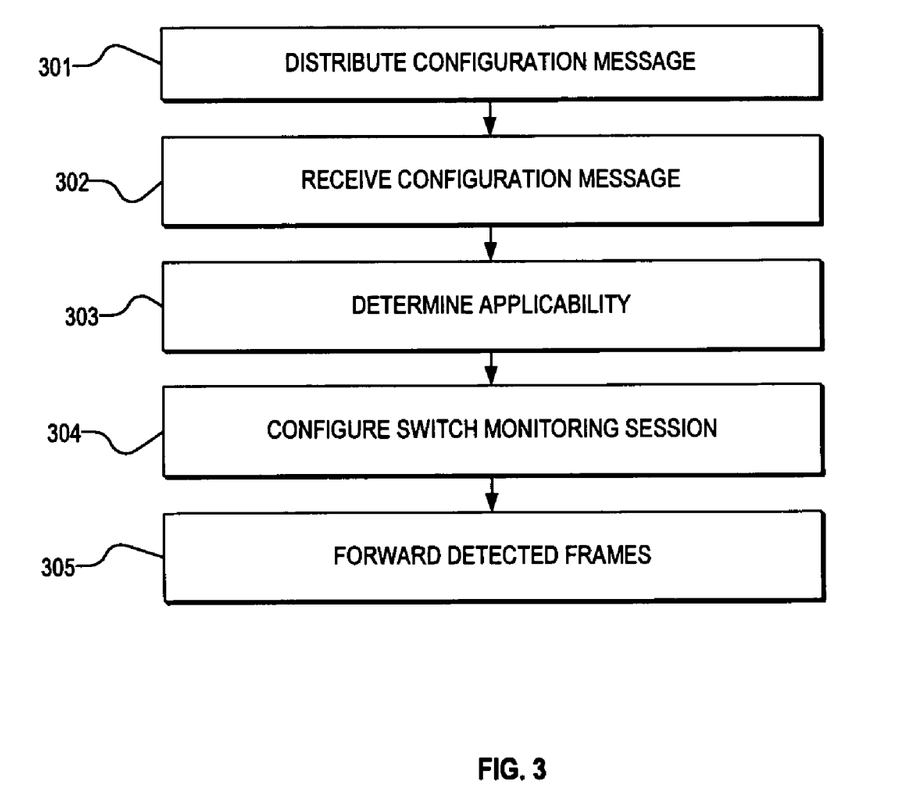
FIG. 3 is a flowchart illustrating a process for monitoring network traffic, in accordance with embodiments of the present invention.

FIG. 3 is a flowchart illustrating a process for monitoring network traffic, in accordance with embodiments of the present invention. In step 301, a monitoring configuration message is distributed to the fabric elements 120. This monitoring configuration message will include the classification criteria identifying communications to be monitored and may be transmitted to all of the fabric elements 120 or a subset of the fabric elements 120. In step 302, the fabric elements 120 receive the monitoring configuration message. In step 303, each fabric element 120 may optionally determine whether to initiate a monitoring session for that element based on the classification criteria contained in the monitoring configuration message. In step 304, each fabric element 120 for which the monitoring configuration message is applicable initiates the monitoring session to monitor the identified types of communications. In step 305, each fabric element 120 will forward frames detected by the monitoring session to the identified analyzer 140.

For example, an administrator may receive error messages from the host H1 reporting failed transmissions between the host H1 and the storage device D2. The administrator may first invoke an FCTrace operation in order to check the end-to-end connectivity between the host H1 and the storage device D2. If the FCTrace indicates a transmission failure at one of switches, the administrator can attempt to diagnose the problem by investigating only that switch. However, if the FCTrace does not detect a transmission failure, the administrator will be unable to determine what is causing the error in the actual packets being transmitted by the host H1.

Accordingly, the administrator will utilize a management system 150 in order to initiate a new fabric monitoring session for the fabric 110. The management system 150 may comprise a computer system coupled to the switch S7 as a node on the network 100. Alternatively, the management system 150 may comprise a computer system which communicates with the elements 120 in the fabric 110 using, e.g., telnet, Secure Shell (SSH), a serial interface, or Simple Network Management Protocol (SNMP) services. In yet other embodiments, the management system 150 may be a management card provided in a slot in one of the elements 120 in the fabric 110. In yet other embodiments, the management system 150 may be implemented as a part of the switch. Other variations are possible.

The administrator will provide to the management system 150 information regarding the nodes 130 to be monitored. In addition, the administrator may provide information regarding the location of an analyzer in the network 100. In other embodiments, the management system 150 has either automatically detected the location of the analyzer or has previously been provided with the location. Thus, the administrator need not enter the location each time the administrator creates a new fabric monitoring session. In the illustrated embodiment, the analyzer 140 is provided as a separate device from the management system 150. In other embodiments, the analyzer may be provided as an application running on the management system 150. In addition, the analyzer need not have a fibre channel connection to a switch. The remote capture daemon running on the switch may send the captured frames over an out of band Ethernet management port. This can enable an administrator to capture and decode fibre channel frames from a remote PC.

The classification criteria regarding the nodes to be monitored may be provided in a variety of ways. For example, the information may comprise the identity of a source and destination node pair. The source and destination nodes may be identified using, e.g., an FCID or port World Wide Name (pWWN). Other classification criteria that may be used could be based on the source and destination Domain-IDs, Fabric Port WWN (FWWN), etc. The fabric monitoring session will then monitor all frames transmitted between the identified source and destination nodes.

Alternatively, the information regarding the nodes to be monitored may comprise the identity of a set of nodes on the SAN. Any frames transmitted or received by nodes in the identified set will be monitored by the elements 120. The set of nodes may be identified in a variety of ways. For example, Cisco Systems, Inc., has developed Virtual SAN (VSAN) technology, wherein the nodes on a SAN may be logically divided into a plurality of groups, each group representing a single VSAN. The nodes in each VSAN may share the same switches in the fabric 110 in order to transmit frames between nodes.

Once the fabric monitoring session is initiated, the management system 150 will generate a monitoring configuration message to be transmitted to the switches in the fabric 110. This monitoring configuration message will indicate the identity of the nodes to be monitored and the location of the analyzer to which the monitored frames are to be directed.

This monitoring configuration message may be propagated to the switches in a variety of ways. As mentioned above, in some embodiments, the message may be propagated using CFS. CFS provides an in band protocol enabling switches to discover the other switches in the fabric. In these embodiments, CFS utilizes the transport services in the Fibre Channel network layer (FC2) to send information to other switches. The monitoring configuration message may be transmitted using CFS to all of the switches in a VSAN or all of the switches in the fabric 110. In other embodiments, other mechanisms may be used for distributing the monitoring configuration message to the switches.

In this embodiment, the management system 150 will transmit substantially the same monitoring configuration message to all of the fabric elements 120 in the fabric 110. This configuration message will identify the nodes to be monitored and the location of the analyzer to which the monitored frames should be forwarded. Each fabric element 120 (e.g., the controller 210 in each switch SW1-SW7) will then determine based on the information contained in the configuration message and other state information available in the fabric, whether to initiate a switch monitoring session on that switch.

In the present example, the configuration message will identify the host H1 and the storage device D2 as the node pair to be monitored. Therefore, all fabric elements 120 that are on one of the expected paths between the host H1 and the storage device D2 are relevant to the target criteria defined by the configuration message.

Referring to FIG. 1, in order to route packets from the host H1 to the storage device D2, the packets must start with switch SW2 (which is connected to host H1) and be delivered to switch SW7 (which is connected to the storage device D2). According to the FSPF protocol, there are three possible paths for routing between switches SW2 and SW7: SW2-SW3-SW4-SW7; SW2-SW3-SW6-SW7; and SW2-SW5-SW6-SW7. Thus, switches SW2, SW3, SW4, SW5, SW6, and SW7 are relevant to the target criteria. In contrast, switch SW1 is not on any of the possible paths between the host H1 and the storage device D2.

The routing table for each switch SW1-SW7 will include these paths. Thus, the controller 210 in each of the switches will be able determine based on the routing table and the information in the configuration message whether that switch is relevant to the target criteria.

In this example, the switches SW2-SW7 will determine that they are each relevant to the target criteria, while the switch SW1 will determine that it is not relevant to the target criteria. Switch SW1 will therefore disregard the monitoring configuration message. Switches SW2-SW7 will then each configure a switch monitoring session to capture the targeted frames.

In other embodiments, all of the switches SW1-SW7 will initiate a switch monitoring session to capture the frames that satisfy the classification criteria, even if the switch does not reside on one of the expected routes. This way, the switches SW1-SW7 need not make the determination whether the target criteria applies to that particular switch.

The configuration of the switch monitoring session may be accomplished in a variety of ways. In one embodiment, the switches will initiate SPAN or RSPAN switch monitoring sessions, depending on the location of the analyzer. If a switch determines that the analyzer identified by the configuration message is provided on one of that switch's ports, the switch will configure a SPAN session to deliver copies of the detected packets to that port. If a switch determines that the identified analyzer is provided on a remote port, the switch will configure a RSPAN session to deliver copies of the detected packets to the remote port.

Exemplary SPAN and RSPAN switch monitoring sessions are described in U.S. Patent Publication No. 2005/0053073 A1, filed Mar. 10, 2005, entitled "Switch Port Analyzers," the contents of which are incorporated by reference herein in its entirety.

As described above, a SPAN session monitors network traffic though an FC interface. Traffic through any FC interface can be replicated to one or more specially-configured ports, called SPAN destination ports (SD ports). The SPAN feature is non-intrusive and does not affect switching of network traffic for any SPAN source ports. Typically, a SPAN session will replicate all network traffic passing through the designated interface on the switch. However, the SPAN switch monitoring session may include a filter to replicate only traffic satisfying the filter criteria. Accordingly, the SPAN session may include a filter such that only communications from the host H1 to the storage device D2 is replicated. All other packets passing through the switch will not be replicated. Alternatively, the SPAN session may specify that all packets to or from a single node be replicated. In yet other embodiments, a VSAN number (or a range of VSAN numbers) is identified as the SPAN source, in which case all supported interfaces in the specified VSAN(s) are included as SPAN sources. The monitoring configuration message may also indicate whether to monitor traffic in the ingress direction, the egress direction, or both directions for any source interface.

For example, suppose the fabric element 120 in FIG. 2 initiates a SPAN switch monitoring session to monitor traffic ingressing port P1 to SD port P4. When a frame of data arrives at port P1, the frame is copied to a buffer associated with port P1. Port P1 determines (e.g., from a header of the packet) that packet should be forwarded to port P3 for egress. Port P1 makes a first replica of the packet from the buffer and transmits the replica to port P3. Before purging the replica of the packet from the buffer, the port P1 makes a second replica of the packet from the buffer and transmits the replica to SD port P4. The FC packet occupies a single buffer but multiple pointers to this packet are created to generate as many copies of the FC packet as required by the user.

RSPAN switch monitoring sessions operate in a similar fashion as SPAN switch monitoring sessions, except that the replica of the traffic being monitored is sent to an SD port on a remote switch instead of an SD port on a local switch.

Conventional SPAN and RSPAN switch monitoring sessions are configured and initiated manually by an administrator on each switch desired to be monitored. In accordance with embodiments of the present invention, the controller 210 in each switch automatically configures a SPAN or RSPAN switch monitoring session in response to receiving the monitoring configuration message from the management system 150. Thus, an administrator need only identify the desired nodes to be monitored (and optionally the location of the analyzer, if the management system 150 is not already aware of the location). Each fabric element 120 may then determine based on configuration message whether a switch monitoring session is needed and the configuration parameters to use for the switch monitoring session. Alternatively, the fabric element 120 may initiate the switch monitoring session without making any determination as to that element's relevance to the targeted nodes, and the monitoring configuration message may include some or all of the configuration parameters used by the element 120.

Data Analysis

In response to the monitoring configuration message generated by the management system 150, the relevant switches will forward replicated packets to the analyzer 140. In accordance with embodiments of the present invention, the analyzer 140 will collect all of the replicated packets and present this data to the administrator so as to provide meaningful information to the administrator.

The switches may be configured to add a label (such as a header) to the replicated packets forwarded to the analyzer 140. The information contained in the header may assist the analyzer 140 in processing the packets. For example, the header may include the WWN of the switch and a timestamp indicating the time that the replicated packet was first received by the switch (in the case of ingress SPAN), the time that the replicated packet was first transmitted by the switch (in the case of egress SPAN), or both. Other information may also be provided in the header, such as the Fabric Port WWNs on which the packet is received and sent (e.g., ingress/egress FWWNs).

In some embodiments, the analyzer 140 may be configured to detect the topology of the fabric 110 and provide a visual representation of the fabric 110 and attached nodes 130. The analyzer 140 can then add the information received in the replicated packets and associated headers to provide the administrator with a visual representation of the path of the packets as they are transmitted from the host H1 to the storage device D2. Ideally, the replicated packets received from the switches will enable the analyzer 140 to determine the location where the data transmission between the host H1 to the storage device D2 failed and/or may identify bottlenecks or other problems with the fabric 110.

The detection of the topology of the fabric 110 may be accomplished in a variety of ways. For example, the Cisco MDS 9000 Family of directors and switches include a Fabric Configuration Server (FCS) feature which provides discovery of topology attributes and maintains a repository of configuration information of fabric elements. The analyzer 140 may query the FCS in order to discover the topology information.

Inter-VSAN Routing

In accordance with embodiments of the present invention, frames that experience a translation between hops in the fabric 110 may still be monitored and replicated to the analyzer 140. The filters generated for the switch monitoring sessions are configured to capture the correct frames, despite the translations.

For example, frames that are routed between VSANs may be monitored and replicated to the analyzer 140. As described above, some SANs are logically divided into a plurality of VSANs in order to provide increased scalability, availability, and security by allowing multiple VSANs to share a common physical infrastructure of switches and ISLs. Normally, data isolation prevents the nodes in a VSAN from communicating with nodes of other VSANs. However, it may be desirable to allow certain resources to be shared across VSANs, such as in the case of a backup tape library system.

Referring to FIG. 1, a first VSAN (VSAN1) may include the hosts H1 and H3 and the storage device D1, and a second VSAN (VSAN2) may include the host H2 and the storage device D2. In this case, if the host H1 wishes to communicate with the storage device D2 (e.g., a tape library system), the frames must cross the boundary between VSAN1 and VSAN2. When the frame crosses the boundary, the identification of the destination node will be translated to another value. For example, when frames cross the VSAN boundaries, a NAT is performed to rewrite the source and destination FCIDs appropriately to the corresponding values in the next hop VSAN.

In order to monitor both the actual and translated frames, each switch in either VSAN1 or VSAN2 may perform a lookup on the NAT table for each packet being transmitted in order to determine whether the packet should be forwarded.

Switch-Specific Monitoring Configuration Message

In accordance with other embodiments, the management system 150 will determine which fabric elements 120 are relevant to the target nodes to be monitored and will transmit monitoring configuration messages only to those relevant fabric elements 120. The management system 150 may accomplish this by providing its own routing table for the fabric 110. Thus, when an administrator requests that a fabric monitoring session be invoked, the switches will not each need to determine whether they need to initiate a switch monitoring session.

Embodiments of the present invention may provide various advantages not provided by prior art systems. In particular, a fabric administrator need not individually configure each switch in a fabric in order to identify failures in the fabric. The administrator merely identifies the target node or nodes and the location of the analyzer. The switches utilize their existing knowledge about the routing in the fabric to determine whether they are relevant to the desired monitoring and configure themselves to initiate the appropriate switch monitoring session (e.g., SPAN or RSPAN session).

In addition, the actual data frames between nodes are monitored and replicated. This is in contrast with the FCTrace function in which a special FCTrace frame is generated and transmitted across the fabric. As a result, the administrator can have a greater level of assurance that the frames being monitored experience the same routing and handling as normal data traffic.

While the invention has been described in terms of particular embodiments and illustrative figures, those of ordinary skill in the art will recognize that the invention is not limited to the embodiments or figures described. For example, embodiments described above relate to the monitoring of strains in a Fibre Channel fabric implemented using the Cisco MDS 9000 Family of switches and directors. However, other embodiments may be adapted for use with other protocols and environments, such as any packet-switched network.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of monitoring network traffic, comprising:
transmitting a monitoring configuration message to a plurality of fabric elements in a Fibre Channel network, said monitoring configuration message comprising classification criteria identifying packets to be monitored;
receiving copies of identified packets from the plurality of fabric elements; and
analyzing the copies of identified packets to determine data transmission status in the Fibre Channel network;
wherein the analyzing further comprises identifying a route followed by the identified packets.

2. The method of claim 1, wherein:
said monitoring configuration message further comprises a location of an analyzer for receiving copies of identified packets from the plurality of fabric elements.

3. The method of claim 1, wherein:
said classification criteria identifies a source node and a destination node.

4. The method of claim 1, wherein:
said classification criteria identifies a Virtual SAN (VSAN).

5. The method of claim 1, wherein:
said classification criteria identifies a Fabric Port WWN (FWWN).

6. The method of claim 1, further comprising:
receiving the monitoring configuration message at one of the plurality of fabric elements; and
initiating a monitoring session at the one of the plurality of fabric elements based on the classification criteria in the configuration message.

7. The method of claim 6, wherein:
said initiating the monitoring session comprises determining based on the classification criteria that the fabric element is relevant to the classification criteria.

8. The method of claim 6, wherein:
said fabric element comprises a switch.

9. The method of claim 6, further comprising:
receiving a data packet at the one of the plurality of fabric elements; and
determining whether the data packet satisfies the classification criteria.

10. The method of claim 9, wherein:
said determining whether the data packet satisfies the classification criteria comprises determining whether the packet is directed to an identified destination node.

11. The method of claim 10, wherein:
said determining whether the packet is directed to the identified destination node comprises determining whether the packet is directed to a translated identity of the identified destination node.

12. The method of claim 1, further comprising:
receiving a request from a user to monitor network traffic in the Fibre Channel network;
wherein said transmitting the monitoring configuration message to the plurality of fabric elements is performed in response to said receiving the request.

13. A Fibre Channel network, comprising:
a plurality of fabric elements;
a management system configured to transmit a monitoring configuration message to the plurality of fabric elements, said monitoring configuration message comprising classification criteria identifying packets to be monitored; and
an analyzer configured to:
receive copies of identified packets from the plurality of fabric elements; and analyze the copies of identified packets to determine data transmission status in the Fibre Channel networks;

wherein the analyzer is further configured to analyze the conies of identified packets by identifying a route followed by the identified packets.

14. The network of claim 13, wherein:

said monitoring configuration message further comprises a location of an analyzer for receiving copies of identified packets from the plurality of fabric elements.

15. The network of claim 13, wherein:

said classification criteria identifies a source node and a destination node.

16. The network of claim 13, wherein:

said classification criteria identifies a Virtual SAN (VSAN).

17. The network of claim 13, wherein:

said classification criteria identifies a Fabric Port WWN (FWWN).

18. The network of claim 13, wherein:

each of the plurality of fabric elements is configured to:
 receive the monitoring configuration message; and
 initiate a monitoring session based on the classification criteria in the configuration message.

19. The network of claim 18, wherein:

each of the plurality of fabric elements is configured to initiate the monitoring session by determining based on the classification criteria that the fabric element is relevant to the classification criteria.

20. The network of claim 18, wherein:

at least one of the plurality of fabric elements comprises a switch.

21. The network of claim 18, wherein:

each of the plurality of fabric elements is configured to:
 receive a data packet; and
 determine whether the data packet satisfies the classification criteria.

22. The method of claim 21, wherein:

each of the plurality of fabric elements is configured to determine whether the data packet satisfies the classification criteria by determining whether the packet is directed to an identified destination node.

23. The method of claim 22, wherein:

each of the plurality of fabric elements is configured to determine whether the packet is directed to the identified destination node by determining whether the packet is directed to a translated identity of the identified destination node.

24. The network of claim 13, further comprising:

said management system is configured to receive a request from a user to monitor network traffic in the Fibre Channel network;

wherein said transmitting the monitoring configuration message to the plurality of fabric elements is performed in response to said receiving the request.

25. A Fibre Channel network, comprising:

a plurality of fabric elements; and a means for transmitting a monitoring configuration message to the plurality of fabric elements, said monitoring configuration message comprising classification criteria identifying packets to be monitored;

an analyzer means configured to:
 receive copies of identified packets from the plurality of fabric elements; and
 analyze the copies of identified packets to determine data transmission status in the Fibre Channel network wherein said analyzer means is further configured to analyze the copies of identified packets by identifying a route followed by the identified packets.

26. A switch, comprising:

a controller configured to:
 receive a monitoring configuration message, said monitoring configuration message comprising classification criteria identifying packets to be monitored; and
 initiate a monitoring session based on the classification criteria in the configuration message;

wherein the classification criteria identifies a source node and a destination node of the packets to be monitored.

27. The switch of claim 26, wherein:

said controller is configured to perform the monitoring session by forwarding a copy of the identified packets satisfying the classification criteria to an analyzer.

28. The switch of claim 26, wherein:

said classification criteria identifies a Virtual SAN (VSAN).

29. The switch of claim 26, wherein:

said classification criteria identifies a Fabric Port WWN (FWWN).

30. The switch of claim 26, further comprising:

said controller is configured to initiate the monitoring session by determining based on the classification criteria that the fabric element is relevant to the classification criteria.

31. The switch of claim 26, wherein the controller is further configured to:

receive a data packet; and determine whether the data packet satisfies the classification criteria.

32. The switch of claim 31, wherein:

said controller is configured to determine whether the data packet satisfies the classification criteria by determining whether the packet is directed to an identified destination node.

33. The switch of claim 32, wherein:

said controller is configured to determine whether the packet is directed to the identified destination node by determining whether the packet is directed to a translated identity of the identified destination node.

34. The switch of claim 26, further comprising:

a plurality of ports configured to receive and transmit a frame;

wherein the controller is coupled to the plurality of ports.

* * * * *

UNITED STATES PATENT AND TRADEMARK OFFICE
CERTIFICATE OF CORRECTION

PATENT NO. : 7,656,812 B2
APPLICATION NO. : 11/495405
DATED : February 2, 2010
INVENTOR(S) : Tadimeti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Twenty-eighth Day of December, 2010

David J. Kappos
*Director of the United States Patent and Trademark Office*